(12) United States Patent
Cross

(10) Patent No.: US 6,603,617 B1
(45) Date of Patent: Aug. 5, 2003

(54) METHOD AND APPARATUS FOR PROVIDING ADAPTIVE DRIVE-LEVEL COMPENSATION FOR AMPLITUDE AND BER LOSS DUE TO MEDIA THERMAL DECAY

(75) Inventor: Ralph W. Cross, Lyons, CO (US)

(73) Assignee: Maxtor Corporation, Longmont, CO (US)

( * ) Notice: Subject to any disclaimer, the term of this patent is extended or adjusted under 35 U.S.C. 154(b) by 256 days.

(21) Appl. No.: 09/791,056

(22) Filed: Feb. 21, 2001

(51) Int. Cl.[7] .............................................. G11B 27/36
(52) U.S. Cl. ............................ 360/31; 360/66; 360/68; 360/53
(58) Field of Search .............................. 360/31, 55, 25, 360/66, 46, 67, 68, 53; 324/210, 212, 226

(56) References Cited

U.S. PATENT DOCUMENTS 5,923,485 A * 7/1999 Ito ................................. 360/31
6,429,984 B1 * 8/2002 Alex ............................. 360/31

OTHER PUBLICATIONS

Dhagat, P. et al.; "Sub–millisecond Spin–stand Measurements of Thermal Decay in magnetic Recordings"; Submitted IEEE Trans. Magn., Mar. 5, 1999.

Toigo, "Avoiding a Data Crunch," *Scientific American*, May 2000, pp. 57, 59–61, 64–67 and 70–74.

Toigo, "Avoiding a Data Crunch," *Scientifice American*, May 2000, pp. 57, 59–61, 64–67 and 70–74.

* cited by examiner

*Primary Examiner*—Alan T. Faber
(74) *Attorney, Agent, or Firm*—Tejpal S. Hansra

(57) ABSTRACT

A method and apparatus for providing adaptive drive-level compensation for amplitude and BER loss due to media thermal decay is disclosed. Specifically, in one embodiment, a disk surface having information stored thereon is provided. The information is written in the form of magnetic transitions, which are subject to thermal decay. A head is used to read the information stored on the disk surface and is biased by a bias current (or a bias voltage). A value related to the thermal decay of the magnetic transitions is determined. If the value indicates that the thermal decay has reached an unacceptable level, the bias current is increased in order to compensate for the thermal decay of the magnetic transitions. Once a bias current limit has been reached, information stored on the disk surface is rewritten.

47 Claims, 6 Drawing Sheets

Fig. 1(a) Information data

Fig. 1(b) Writing currents

Fig. 1(c) Medium magnetizations

Fig. 1(d) Magnetic flux changes in read head

Fig. 1(e) Waveforms of read voltage

METHOD AND APPARATUS FOR PROVIDING ADAPTIVE DRIVE-LEVEL COMPENSATION FOR AMPLITUDE AND BER LOSS DUE TO MEDIA THERMAL DECAY

FIELD OF THE INVENTION

The present invention relates to magnetic storage devices and, more particularly, to computer disk drives. More specifically, the present invention relates to compensating for amplitude and BER (bit error rate) loss due to media thermal decay.

BACKGROUND OF THE INVENTION

Computer disk drives store digital information on magnetic disks which are coated with a magnetic material that is capable of changing its magnetic orientation in response to an applied magnetic field. Typically, the digital information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

More specifically, during operation of a conventional disk drive, a magnetic transducer is placed above a desired track of the disk while the disk is spinning. Writing is performed by delivering a write signal having a variable current to the transducer while the transducer is held close to the track. The write signal creates a variable magnetic field at a gap portion of the transducer that induces magnetic polarity transitions into the desired track which constitute the data being stored.

Reading is performed by sensing the magnetic polarity transitions on the rotating track with the transducer. As the disk spins below the transducer, the magnetic polarity transitions on the track present a varying magnetic field to the transducer. The transducer converts the varying magnetic field into an analog read signal that is delivered to a read channel for appropriate processing. The read channel converts the analog read signal into a properly-timed digital signal that can be recognized by a host computer system.

The transducer can include a single element, such as an inductive read/write element for use in both reading and writing, or it can include separate read and write elements. Typically, transducers include separate elements for reading and writing. Such transducers are known as "dual element heads" and usually include a magneto-resistive (MR) read element or giant magneto-resistive (GMR) read element for performing the read function.

Dual element heads are advantageous because each element of the transducer can be optimized to perform its particular function. For example, MR read elements are more sensitive to small variable magnetic fields than are inductive heads and, thus, can read much fainter signals from the disk surface. Because MR elements are more sensitive, data can be more densely packed on the surface with no loss of read performance.

MR read elements generally include a strip of magneto-resistive material that is held between two magnetic shields. The resistance of the magneto-resistive material varies almost linearly with applied magnetic field. During a read operation, the MR strip is held near a desired track, with the varying magnetic field caused by the magnetic transitions on the track. A constant DC current is passed through the strip resulting in a variable voltage across the strip. By Ohm's law (i.e., V=IR), the variable voltage is proportional to the varying resistance of the MR strip and, hence, is representative of the data stored within the desired track. The variable voltage signal (which is the analog read signal) is then processed and converted to digital form for use by the host. GMR read elements operate in a similar manner.

FIGS. 1(a)–1(e) are simplified diagrammatic representations which illustrate how data is written as transitions on a disk surface and how the transitions are read from the disk surface as data. As background, a transition is where the magnetization in the disk media changes. In general, there are two types of transitions possible; that is, where south poles face south poles and where north poles face north poles.

FIGS. 1(a)–(c) illustrate the write process in simplified form. Specifically, FIG. 1(a) illustrates a data sequence in the form of "ones" and "zeros," which is to be stored on the disk media. FIG. 1(b) illustrates the write current in the write coil for one method of storing the data sequence. In such method, the current through the write coil is reversed at each "one" and remains the same at each "zero" (see FIGS. 1(a) and 1(b)). Consequently, as the disk media is rotated under the write head, the disk media is magnetized as shown in FIG. 1(c). It should be noted that magnetic transitions occur at each "one" and not at each "zero." It should also be noted that FIG. 1(c) represents the magnetization of the media for a portion of a track, which is shown in a linear rather than arcuate shape, as will be understood by those skilled in the art.

FIGS. 1(d) and 1(e) illustrate the read process in simplified form. As mentioned above, as the disk media is rotated under the read head, a constant DC current is passed through the MR strip in the read head. The magnetic transitions stored in the disk media cause the magnetic field applied to the MR strip in the read head to vary, as shown in FIG. 1(d). Since the resistance of the magneto-resistive material varies almost linearly with applied magnetic field, the varying magnetic field caused by the magnetic transitions on the disk media results in a variable voltage across the strip. By Ohm's law (i.e., V=IR), the variable voltage is proportional to the varying resistance of the MR strip and, hence, is representative of the data stored within the desired track, as shown in FIG. 1(e). The variable voltage signal (which is the analog read signal) is then processed and converted to digital form for use by the host.

The amount of information capable of being stored on a disk surface is determined, in part, by the minimum size of individual transitions. As is known to those skilled in the art, the minimum size of individual transitions is based (among other things) upon the grain size of the magnetic material forming the magnetic layer of the disk surface. In order to increase the amount of information capable of being stored on the disk surface, disk manufacturers have been continuously reducing the grain size of the magnetic material and, hence, have reduced the minimum size of individual transitions. For the magnetic layer of the disk, the remnant magnetization-thickness product has also been reduced to achieve higher linear densities and enhanced writer performance. Most of this reduction has been achieved by reducing the thickness of the magnetic layer of the disk, and hence, the grain thickness, which reduces the grain size.

Traditionally, about 500 to 1000 grains of magnetic material were required to store a bit of information.

However, at present, a transition may be stored in about 100 grains of magnetic material. It is expected that the number of grains of magnetic material required to store a bit of information will continue to decrease over time. To reduce transition noise and increase the number of grains in a transition, both the diameter of the grains and the separation between the grains have been decreased. In fact, the diameter of the grains has decreased from approximately 15 nm down to approximately 9–10 nm. This has driven disk vendors to produce disks with smaller grain volumes.

As will be understood by those skilled in the art, each grain has a certain magnetic anisotropy energy associated with it. More specifically, the anisotropy energy of a grain is a fixed amount of energy required to "hold" a stored direction of magnetization in the magnetic material, and is equal to the anisotropy energy density, Ku, times the volume of the grain, V. A thermal instability ratio is defined as the anisotropy energy divided by the thermal energy, KT, and is given by the formula KuV/KT, which should be greater than 50 for adequate thermal stability.

As grain sizes have been reduced, the anisotropy energy associated with each grain has been reduced. In fact, the anisotropy energy of each grain has been reduced such that it is comparable to the ambient thermal energy in the disk drive. Consequently, the thermal energy in the disk drive randomly excites grains in the magnetic material causing changes in the direction of magnetization of the magnetic material over time. Ultimately, if a threshold number of grains change their direction of magnetization, information stored on the disk may be lost. This phenomenon is known as the superparamagnetic effect (or thermal decay). Furthermore, the superparamagnetic limit is defined as the threshold number of grains in which magnetization changes must occur, due to thermal decay, to cause a loss of information.

In other words, the superparamagnetic effect is a thermal relaxation of information stored on the disk surface. Because the superparamagnetic effect may occur at room temperature, over time, information stored on the disk surface will begin to decay. Once the stored information decays beyond a threshold level, it will be unable to be properly read by the read head and the information will be lost.

More specifically, the superparamagnetic effect manifests itself by a loss in amplitude in the readback signal over time. Accordingly, this causes the bit error rate (BER) to increase. As is well known, the BER is the ultimate measure of drive performance in a disk drive.

In general, a certain number of bit errors may be corrected by a disk drive's error correction code (ECC). However, as is well-known, ECC information adds to the overall overhead of a disk drive, which limits the amount of information that can be stored on a disk surface. Accordingly, disk drives exhibiting high bit error rates that require correction by a large amount of ECC overhead are generally disfavored.

Without a doubt, the superparamagnetic effect poses significant problems in the disk drive industry, where information must be reliably stored and reliably recovered. In order to overcome the problems associated with the superparamagnetic effect, at least one disk-side solution has been proposed.

For example, disk manufacturers have tried to make disks having grains of magnetic material with higher anisotropy energies. In order to increase anisotropy energies in the grains, larger grain sizes are generally used. Using larger grain sizes, however, causes signal-to-noise problems. Specifically, larger grains produce more transition noise, which limits the SNR of the system and ultimately the BER. If the anisotropy energy is increased by increasing the anisotropy constant, Ku, which increases the coercivity, Hc, it becomes difficult to write transitions on the disk.

In addition to the above, there are additional reasons why disk-side solutions may be insufficient. Specifically, properties of the disks may vary from disk-to-disk, not only between different disk manufacturers, but also between the same disk manufacturer. For example, the grain size and anisotropy energies of the magnetic material may vary between disks of the same manufacturer.

Furthermore, while the superparamagnetic effect may occur at room temperature (i.e., nominally 25 degrees Centigrade), disk drives operating at higher temperatures are more susceptible to the problems associated with the superparamagnetic effect. Due to the fact that most disk drives are located within a PC chassis and such chassis are filled with electronic circuitry, many disk drives are operated at temperatures of about 60 degrees Centigrade. Others are operated at even higher temperatures, depending (in part) upon the characteristics of the PC chassis. Thus, while a group of disks manufactured by one or more manufacturers may not be seriously affected by the problems associated with the superparamagnetic effect in a particular disk drive, the same group of disks may suffer from problems associated with the superparamagnetic effect in other disk drives.

Accordingly, it would be advantageous to provide a drive-based (also known as drive-level) solution to the problems associated with the superparamagnetic effect, so that accommodations may be made for the varying properties associated with individual disks in a disk drive and so that accommodations may be made for variations in operating temperatures of disk drives. Furthermore, it would be advantageous to provide a drive-level solution to the problems associated with the superparamagnetic effect which is adaptive, so that corrective action may be taken based upon the extent of thermal decay that has occurred.

SUMMARY OF THE INVENTION

The present invention is designed to overcome the aforementioned problems and meet the aforementioned, and other, needs.

In one embodiment, a method is provided for supplying adaptive drive-level compensation for amplitude and BER loss due to media thermal decay. Specifically, a disk surface is provided, wherein the disk surface has information stored thereon. The information is written in the form of magnetic transitions, which are subject to thermal decay. A head is used to read the information stored on the disk surface and is biased by a bias current (or a bias voltage).

In order to compensate for thermal decay of the information stored on the disk surface, high frequency and BER reference sectors are written near the inner diameter of the disk surface. During a drive initialization procedure, initial values read from both the high frequency reference sector and the BER reference sector are stored in memory.

Upon the expiration of a specified amount of time, the high frequency reference sector and the BER reference sector are read, and their values are compared to their initial values to determine the extent of thermal decay of the disk surface. If either of the values fall outside of a predetermined specification relative to the initial values, an opti routine is performed.

In the opti routine, the bias current (or bias voltage) is incrementally raised, in an effort to compensate for the thermal decay and to bring the values within the predetermined specification. However, the bias current (or bias voltage) may only be raised up to a predetermined bias current limit (or bias voltage limit).

Once the bias current limit (or bias voltage limit) is reached, the information stored on the disk surface is re-written. Furthermore, the bias current (or bias voltage) preferably is then returned to its initial value. Since thermal decay is a function of time, rewriting the information on the disk surface causes the information to be refreshed. Thus, the amplitude of the high frequency reference sector and the BER of the BER reference sector will be brought to acceptable levels.

In order to ensure that the drive is not powered down during the re-write process, a message is preferably generated to let a user know that the disk surface is being rewritten and that power should not be shut off. Optionally, the data can be redundantly moved into the computer's RAM or disk drive's RAM, rewritten, verified and then deleted from RAM (or simply overwritten).

It should be understood that this summary section is only intended to provide an overview of the invention. Furthermore, this summary section does not necessarily disclose all features and embodiments of the invention. Instead, further details are provided in the detailed description section and the drawings. Thus, other objects, embodiments, features, aspects and advantages of the invention will be apparent from the following specification taken in conjunction with the following drawings.

DETAILED DESCRIPTION OF THE PREFERRED EMBODIMENT

Figure 1:
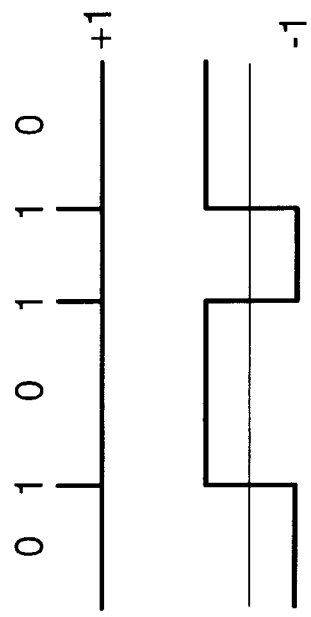
FIGS. 1(a)–(e) are simplified diagrammatic representations which illustrate the process of writing data as transitions on a disk surface and the process of reading transitions from the disk surface as data.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiment illustrated.

Figure 2:
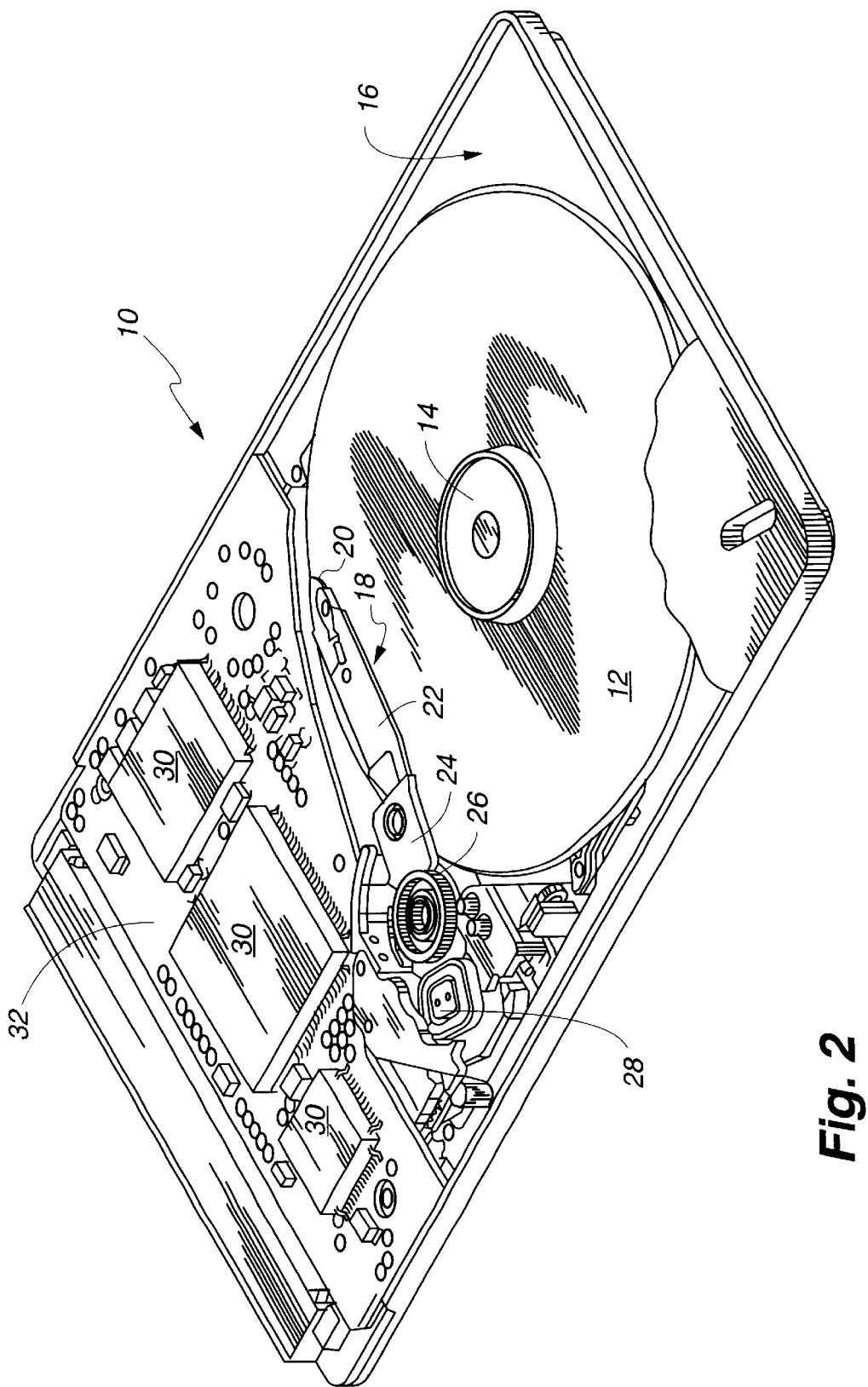
FIG. 2 is a diagrammatic representation of a disk drive in which the present invention may be implemented.

A disk drive 10 with which the present invention may be used is illustrated in FIG. 2. The disk drive comprises a disk 12 that is rotated by a spin motor 14. The spin motor 14 is mounted to a base plate 16.

The disk drive 12 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

It should be understood that the disk drive 10 may include a plurality of disks 12 and, therefore, a plurality of corresponding actuator arm assemblies 18. It should also be understood that the principles described herein are equally applicable to such disk drives.

Figure 3:
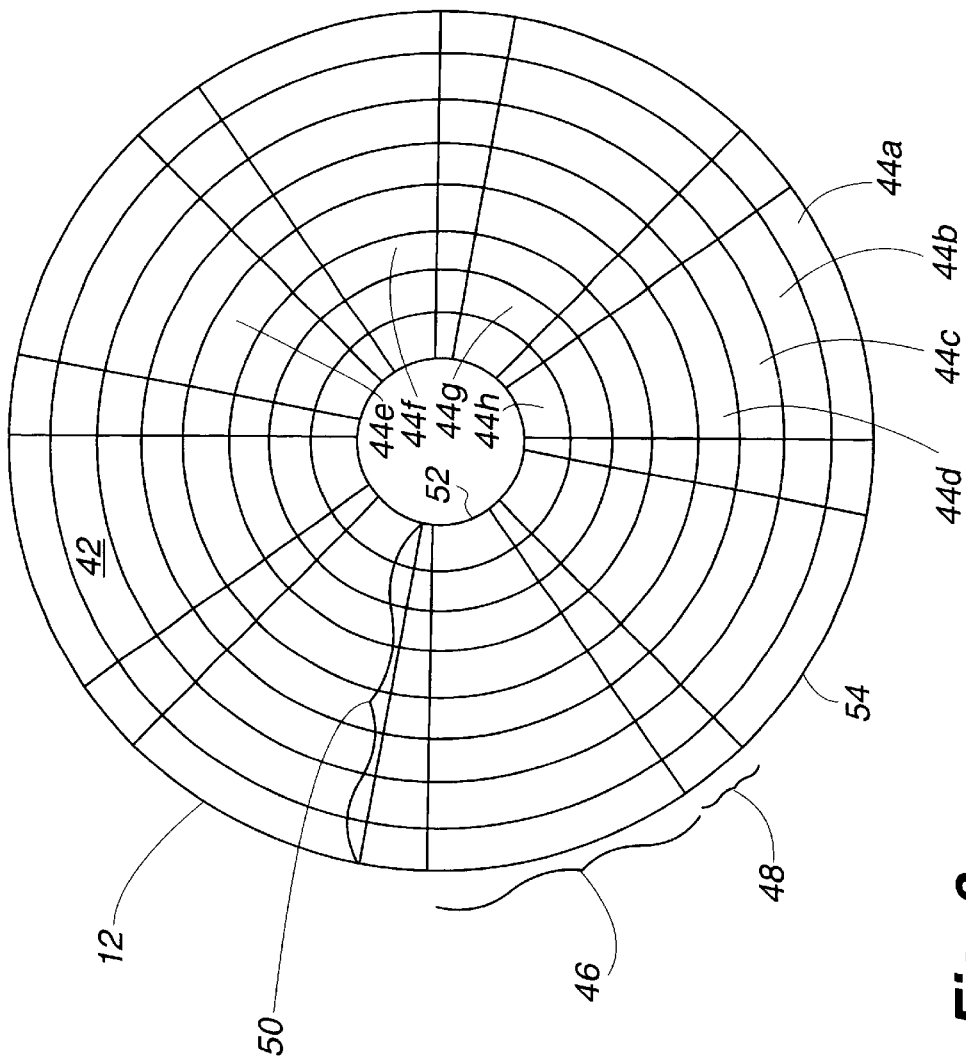
FIG. 3 is a diagrammatic representation illustrating a disk surface which has been formatted to be used in conjunction with a sectored servo system.

FIG. 3 is a diagrammatic representation of a simplified top view of a disk 12 having a surface 42 which has been formatted to be used in conjunction with a conventional sectored servo system (also known as an embedded servo system). As illustrated in FIG. 3, the disk 12 includes a plurality of concentric tracks 44a–44h for storing data on the disk's surface 42. Although FIG. 3 only shows a relatively small number of tracks (i.e., 8) for ease of illustration, it should be appreciated that typically many thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54). The servo sectors 48 are used to position the head 20 associated with each disk 12 during operation of the disk drive 10.

In conceiving of the present invention, the inventor has made a number of observations relating to the superparamagnetic effect, some of which are listed below. Specifically, the inventor has recognized that the superparamagnetic limit is likely to be reached when information has been stored on a disk surface for a long period of time. The inventor has also recognized that the superparamagnetic effect manifests itself by a loss in amplitude of the readback signal. Further, the inventor has recognized that the problems associated with the superparamagnetic effect are likely to occur in data sectors, as opposed to servo sectors, since data densities are relatively higher therein. Yet further, the inventor has recognized that problems associated with the superparamagnetic effect are exacerbated in data sectors which are located towards the inner diameter of the disk surface, since data densities at such data sectors are higher relative to data densities of data sectors located closer to the outer diameter of the disk surface. Even further, the inventor has recognized that the superparamagnetic effect will cause decreases in the BER.

With these and other observations in mind, the inventor of the present invention has developed a method and apparatus for providing adaptive drive-level compensation for amplitude and BER loss due to thermal decay. The particulars of certain embodiments of the present invention will now be described with reference to FIGS. 4 and 5.

Figure 4A:
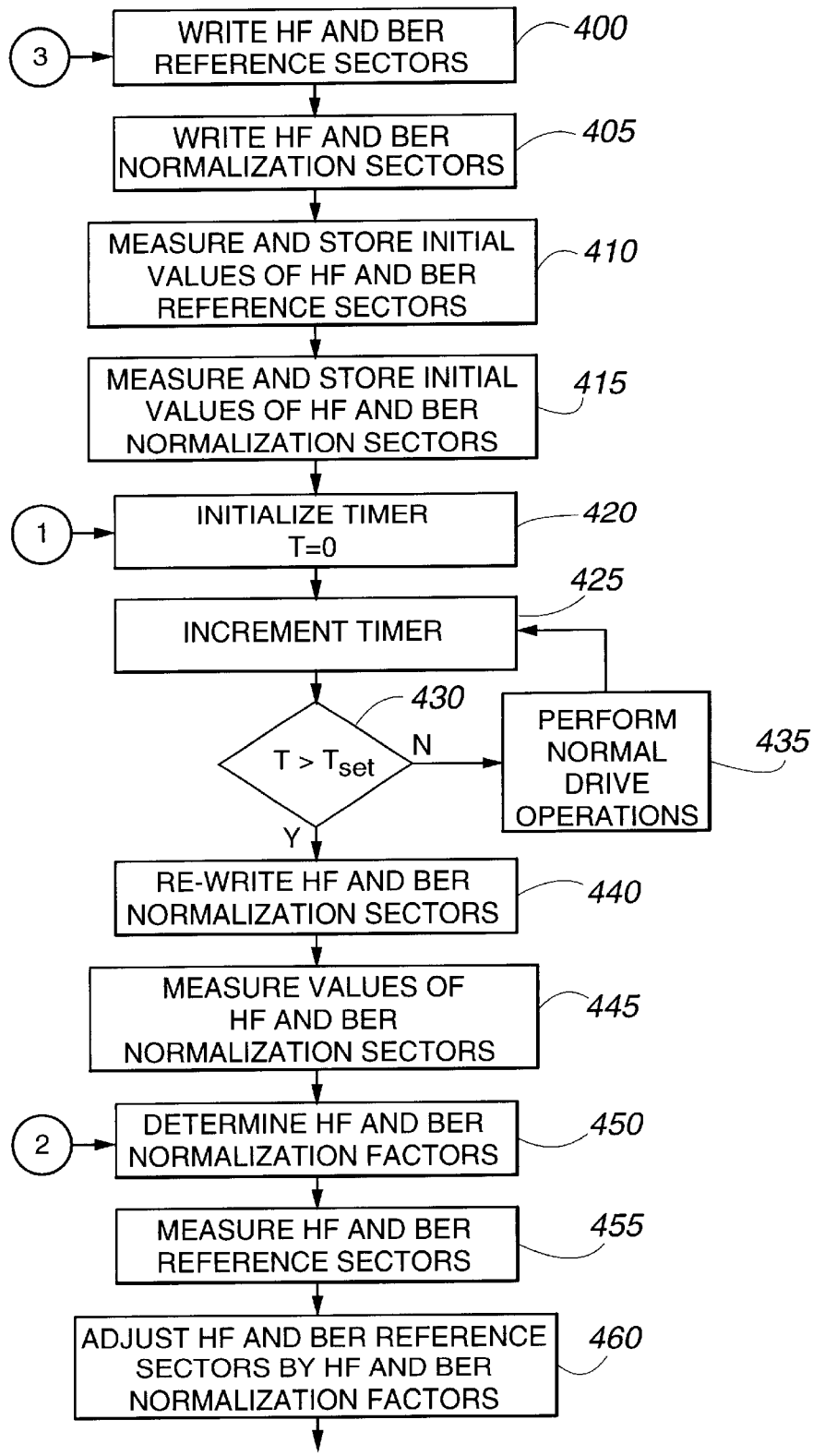
FIGS. 4A and 4B comprise a simplified flow diagram illustrating one manner of implementing the present invention; and, FIG. 5 is a diagrammatic representation, similar to that shown in FIG. 3, that contains reference sectors and normalization sectors which may be used in conjunction with the present invention.
Figure 4B:
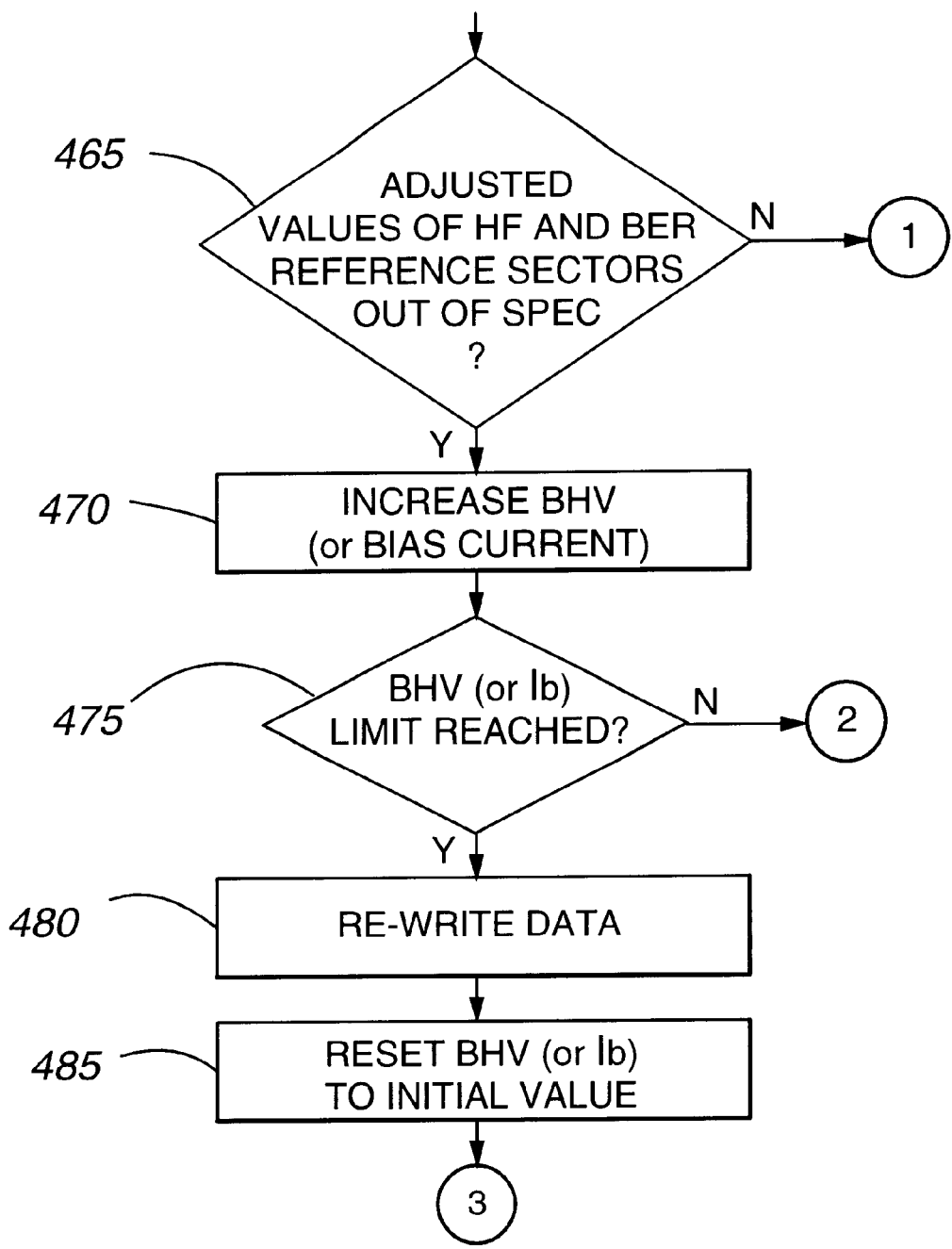

FIG. 4 is a simplified flow diagram illustrating one method of implementing the present invention. It should be understood that there are many other ways of implementing the present invention and FIG. 4 shows one of a number of possibilities.

Figure 5:
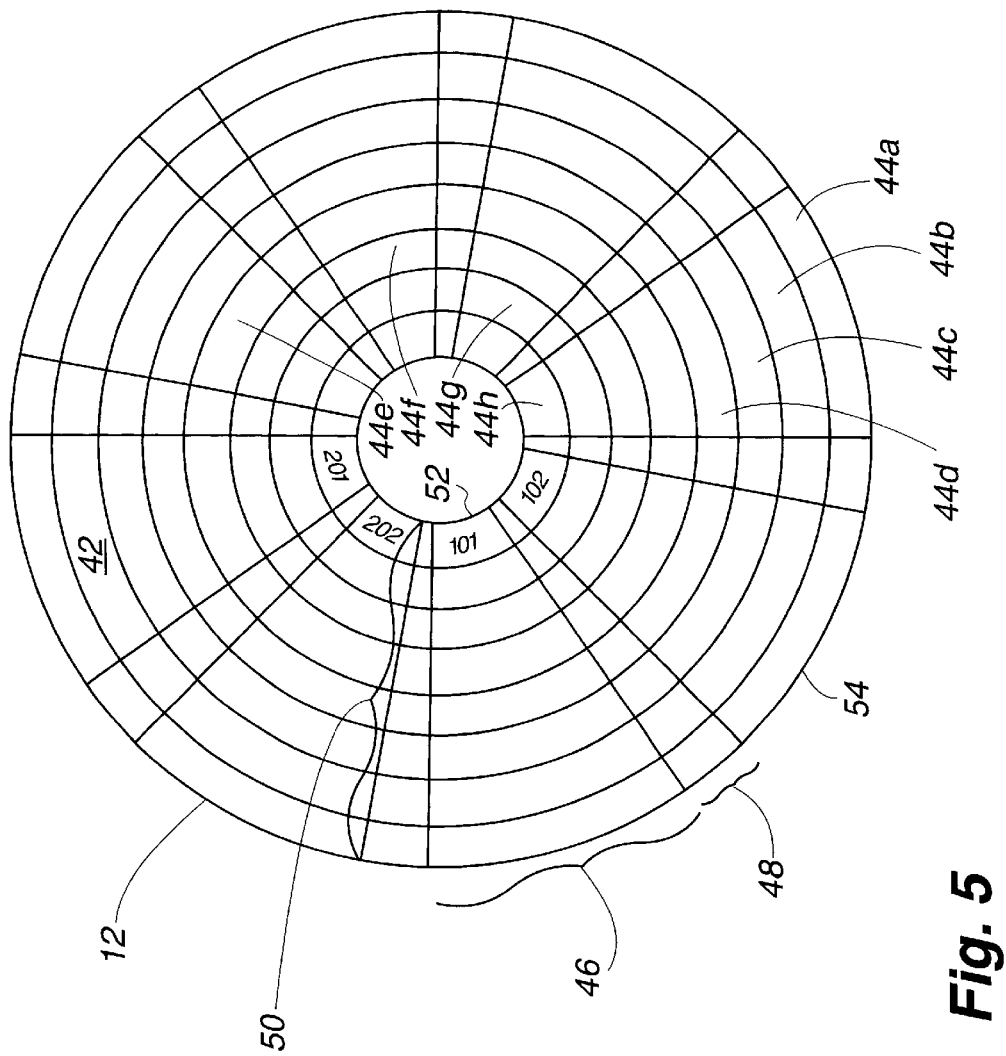

FIG. 5 is a diagrammatic representation, similar to that shown in FIG. 3, except that the disk surface 42 includes high frequency reference sector 101, BER reference sector 102, high frequency normalization sector 201 and BER normalization sector 202, all of which may be used in conjunction with the present invention. Specifically, high frequency reference sector 101 and BER reference sector 102 may be used to compensate for loss in both readback signal amplitude and in BER due to media thermal decay (i.e., the superparamagnetic effect), respectively, in accordance with one embodiment of the present invention as will be described in further detail below.

Reference is now made to FIG. 4, which can generally be divided into three major components, namely: (1) drive initialization (steps 400, 405, 410 and 415), (2) drive operation (steps 420, 425, 430, 435, 440, 445, 450, 455, 460 and 465) and (3) opti routine (steps 470, 475, 480 and 485).

With reference to FIGS. 4 and 5, during drive initialization, a high frequency reference sector 101 and a BER reference sector 102 are written on the disk surface 42 (step 400). The high frequency reference sector 102 is used to measure high frequency amplitude of the readback signal; that is, the amplitude of the readback signal where data is generally most densely packed. Because the thermal decay rate (i.e., superparamagnetic effect) increases as bit spacing decreases (i.e., bit density increases) and because the bit spacing is generally near a minimum at the inner diameter 52, the high frequency reference sector 101 is preferably located near the inner diameter 52 of the disk surface 42. The high frequency reference sector preferably includes a 1T pattern, which is the highest permissible frequency of transitions.

The BER reference sector 102 is also preferably written near the inner diameter 52 of the disk surface 42, since bit densities are greatest at the inner diameter 52. Furthermore, the BER reference sector 102 preferably includes a bit pattern which is written as a pseudo-random sequence of transitions, which are used to measure the BER of the BER reference sector. Such sequences vary from low-frequency to high-frequency and are well-known in the art.

High frequency normalization sector 201 and BER normalization sector 202 are also written (step 405) during drive initialization. The patterns of the high frequency normalization sector 201 and the BER normalization sector 202 are preferably (but not necessarily) identical to the patterns of the high frequency reference sector 101 and the BER reference sector 102, respectively.

Next, initial values from both the high frequency reference sector 101 and the BER reference sector 102 are measured and stored in memory (step 410). In addition, initial values from both the high frequency normalization sector 201 and BER normalization sector 202 are likewise measured and stored in memory (step 415). The initial values of the high frequency normalization sector 201 and the BER normalization sector 202 are used to perform normalization calculations (described further below), in order to remove head and preamplifier variations, as will be understood to those skilled in the art.

During drive operation, the high frequency reference sector 101 and BER reference sector 102 are preferably periodically monitored. In one embodiment, the high frequency reference sector 101 and the BER reference sector 102 are measured every two weeks (although other timeframes are contemplated and expected). In another embodiment, the high frequency reference sector 101 and BER reference sector are randomly or pseudo-randomly measured, so long as a predetermined maximum time is not exceeded.

In order to periodically measure the high frequency reference sector 101 and the BER reference sector 102, a timer is used. Specifically, in step 420, the timer is initialized. Next, in step 425, the timer is incremented. In step 430, a determination is made as to whether the value of the timer, T, is greater than the periodic time frame, $T_{set}$, in which the high frequency and BER reference sectors 101, 102 are to be measured. If the value of the timer, T, is not greater than $T_{set}$, then normal drive operations are performed as shown in step 435.

However, if the value of the timer, T, is greater than $T_{set}$, then high frequency normalization sector 201 and BER normalization sector 202 are re-written (step 440). The normalization sectors 201, 202 are re-written in order to verify that changes in the measured values from the high frequency reference sector 101 and the BER reference sector 102 (see step 455) are due to thermal decay, as opposed to other factors. For example, as is well-known in the art, variations may occur in the readback signal due to changes in pre-amp parameters and/or changes to head parameters.

Specifically, just prior to measuring the readback signal from both the high frequency reference sector 101 and the BER reference sector 102, the high frequency normalization sector 201 and BER normalization sector 202 are re-written (step 440). Next, the amplitude of the readback signal from the high frequency normalization sector 201 and the BER from BER normalization sector 202 are measured (step 445).

In step 450, the stored initial values of the high frequency normalization sector 201 and BER normalization sector 202 (see step 410) are then divided by the currently-measured values from the high frequency normalization sector 201 and BER normalization sector 202, respectively, to determine the high frequency normalization factor and BER normalization factor. If no changes occurred to the head and/or preamplifier, then both values should be 1. Otherwise, the values will be different than 1.

In step 455, both the amplitude of the readback signal from the high frequency reference sector 101 and the BER from the BER reference sector 102 are measured. These values are then multiplied by the high frequency normalization factor and BER normalization factor, respectively (step 460).

The extent of thermal decay is determined by dividing the normalized values of the high frequency reference sector 101 and BER reference sector 102 by their respective initial values. The thermal decay, which is expressed as a percent change of the normalized values of the high frequency and BER reference sectors relative to their initial values per unit time (e.g., disk drive decades), may then be determined. An evaluation may then be made as to whether the high frequency amplitude or BER have dropped below their respective specifications. If so, a compensation scheme would be triggered. For example, the compensation scheme may be triggered if the absolute amount of decay, as measured by either of the parameters, is greater than 10%.

Specifically, in step 465, a determination is made as to (1) whether the normalized amplitude of the readback signal from the high frequency reference sector is greater than a predetermined high frequency amplitude value stored in the disk drive's memory and (2) whether the normalized BER for the BER reference sector is less than a predetermined BER value stored in the disk drive's memory. If the normalized amplitude of the read signal is within its specified value and the normalized BER of the BER reference sector is within its specified value, then the timer is re-initialized (step 420). In contrast, if the normalized amplitude of the readback signal is less than the predetermined high frequency value or if the normalized BER of the BER reference sector is greater than the predetermined BER value, then the opti routine is performed.

In the opti routine, the bias current (or the bias voltage, also known as the buffered head voltage) is incrementally increased (step 470). Next, a determination is made as to whether the bias current (or buffered head voltage) has been increased to the bias current limit (or buffered head voltage limit) as set forth in step 475. As will be understood by those skilled in the art, the bias current limit (or buffered head voltage limit) is determined in an attempt to ensure a minimum lifetime of the read head, since the lifetime of the read head decreases as the bias current (or buffered head voltage) increases.

If the bias current (or the buffered head voltage) has not been increased to the bias current limit (or buffered head voltage limit), steps 450, 455 and 460 are repeated to account for the change in bias current (or buffered head voltage). Next, in step 465, a determination is made as to (1) whether the amplitude of the readback signal from the high frequency reference sector is greater than the predetermined high frequency amplitude and (2) whether the value of the BER for the BER reference sector is less than the predetermined BER value (based upon the new bias current or buffered head voltage). If the amplitude of the read signal from the high frequency reference sector is greater than the predetermined high frequency amplitude and the value of the BER for the BER reference sector is less than the predetermined BER value, normal drive operations are resumed with the increased bias current, and the timer is re-initialized (step 420).

Once the bias current (or buffered head voltage) has been incrementally increased to a value such that readback signal from the high frequency reference sector and the BER from the BER reference sector are acceptable, an optional diagnostic (as will be understood by those skilled in the art) can be performed to ensure that the head will not suffer from problems associated with head asymmetry or head instabilities at such bias current (or buffered head voltage). As will be understood by those skilled in the art, the BER will provide strong indications as to whether problems associated with head asymmetry or head instabilities are likely to ensue. Thus, the aforementioned diagnostic is optional.

If, in step 465, the value of the amplitude of the readback signal from the high frequency reference sector is less than the predetermined high frequency amplitude or if the value of the BER for the BER reference sector is less than the predetermined BER value, the bias current (or buffered head voltage) is again incrementally increased (step 470).

If, in step 475, the bias current (or the buffered head voltage) has been incrementally increased to its limit, then the information stored on the disk surface is rewritten on the disk surface (step 480). Furthermore, after rewriting, the bias current (or buffered head voltage) is reset to its initial value (step 485). Subsequently, drive initialization is again performed (steps 400, 405, 410 and 415), as described above, since all of the data has been re-written.

Since thermal decay is a function of time, rewriting the information on the disk surface causes the information to be refreshed. Thus, the high frequency amplitude and BER will be brought to acceptable levels.

In order to ensure that the drive is not powered down during the re-write process, a message is preferably generated to let a user know that the hard drive is being rewritten and that power should not be shut off. Optionally, the data can be redundantly moved into the computer's RAM or disk drive's RAM, rewritten, verified and then deleted from RAM (or simply overwritten).

As will be understood by those skilled in the art, the predetermined HF amplitude value and the predetermined value of the BER are set so that data can be read from the disk surface prior to reaching the failure point.

It should understood that more than one high frequency reference sector and more than one BER reference sector may be used. Furthermore, it should be understood that the invention may only include a BER reference sector (or BER reference sectors) without a high frequency reference sector (or HF reference sectors), or visa-versa.

As an alternative to rewriting the entire disk surface, data may be time-stamped. Thus, data may be rewritten based upon its age in conjunction with the reference sectors, which would set an age cut-off. As yet another alternative, a look-up table or equivalent structure may be provided in the disk drive's memory or the computer's memory, which would cause data to be periodically rewritten based upon its age, without use of the reference sectors.

One of the most appealing aspects of the present invention is that it may be implemented as a firmware-only modification. That is, the present invention may be implemented in firmware without having to modify any structural components of the disk drive.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:

providing a disk surface having information stored thereon, said information being written as magnetic transitions which are subject to thermal decay;

providing a head for reading said information, wherein said head is biased by a bias current;

determining a value related to the thermal decay of the magnetic transitions; and, increasing the bias current to compensate for the thermal decay of the magnetic transitions if the value indicates that the thermal decay has reached an unacceptable level.

2. The method of claim 1, wherein the value related to the thermal decay of the magnetic transitions is determined periodically.

3. The method of claim 1, further comprising the step of:

determining whether the increased biased current has reached a bias current limit.

4. The method of claim 3, wherein said information on the disk surface is rewritten if the increased bias current has reached the bias current limit.

5. The method of claim 4, wherein the bias current is returned to an initial value after the information is rewritten on the disk surface.

6. The method of claim 4, wherein a notification is provided in connection with rewriting the information on the disk surface.

7. The method of claim 1, wherein the value related to the thermal decay of the magnetic transitions is determined by at least the following steps:

writing a high frequency reference sector on the disk surface;

reading a initial value from the high frequency reference sector at a first time;

storing the initial value from the high frequency reference sector in memory;

reading the high frequency reference sector at a second time to obtain a second value from the high frequency reference sector; and, comparing the second value from the high frequency reference sector to the initial value from the high frequency reference sector to determine the extent of thermal decay of the magnetic transitions.

8. The method of claim 7, further including the step of adjusting the second value from the high frequency reference sector to compensate for head and/or preamplifier variations.

9. The method of claim 1, wherein the value related to the thermal decay of the magnetic transitions is determined by at least the following steps:

writing a BER reference sector on the disk surface;

reading a initial value from the BER reference sector at a first time;

storing the initial value from the BER reference sector in memory;

reading the BER reference sector at a second time to obtain a second value from the BER reference sector; and, comparing the second value from the BER reference sector to the initial value from the BER sector to determine the extent of thermal decay of the magnetic transitions.

10. The method of claim 9, further including the step of adjusting the second value from the BER reference sector to compensate for head and/or preamplifier variations.

11. An apparatus comprising:

a disk surface having information stored thereon as magnetic transitions, the magnetic transitions being susceptible to thermal decay;

a head for reading the information from the disk surface, wherein said head is biased by a bias current;

means for determining a value related to the thermal decay of the magnetic transitions; and, means for increasing the bias current to compensate for the thermal decay of the magnetic transitions if the value indicates that the thermal decay has reached an unacceptable level.

12. The apparatus of claim 11, wherein the value related to the thermal decay of the magnetic transitions is determined periodically.

13. The apparatus of claim 11, further comprising means for determining whether the increased biased current has reached a bias current limit.

14. The apparatus of claim 13, wherein said information on the disk surface is rewritten if the increased bias current has reached the bias current limit.

15. The apparatus of claim 14, wherein the bias current is returned to an initial value after the information is rewritten on the disk surface.

16. The apparatus of claim 14, wherein a notification is provided in connection with rewriting the information on the disk surface.

17. The apparatus of claim 11, wherein the means for determining the value related to the thermal decay of the magnetic transitions includes:

means for writing a high frequency reference sector on the disk surface;

means for reading a initial value from the high frequency reference sector at a first time;

means for storing the initial value from the high frequency reference sector in memory;

means for reading the high frequency reference sector at a second time to obtain a second value from the high frequency reference sector; and, means for comparing the second value from the high frequency reference sector to the initial value from the high frequency reference sector to determine the extent of thermal decay of the magnetic transitions.

18. The apparatus of claim 17, further including means for adjusting the second value from the high frequency reference sector to compensate for head and/or preamplifier variations.

19. The apparatus of claim 11, wherein means for determining the value related to the thermal decay of the magnetic transitions includes:

means for writing a BER reference sector on the disk surface;

means for reading a initial value from the BER reference sector at a first time;

means for storing the initial value from the BER reference sector in memory;

means for reading the BER reference sector at a second time to obtain a second value from the BER reference sector; and, means for comparing the second value from the BER reference sector to the initial value from the BER sector to determine the extent of thermal decay of the magnetic transitions.

20. The apparatus of claim 19, further including means for adjusting the second value from the BER reference sector to compensate for head and/or preamplifier variations.

21. A method comprising the steps of:

providing a disk surface having information stored thereon, the information being stored as magnetic transitions that are subject to thermal decay;

providing a head for reading said information;

writing a high frequency reference sector on the disk surface;

writing a BER reference sector on the disk surface;

writing a high frequency normalization sector on the disk surface;

writing a BER normalization sector on the disk surface;

measuring initial values of the high frequency reference sector and the BER reference sector;

storing the initial values of the high frequency reference sector and the BER reference sector in memory;

measuring initial values of the high frequency normalization sector and the BER normalization sector;

storing the initial values of the high frequency normalization sector and the BER normalization sector in memory;

rewriting the high frequency normalization sector and the BER normalization sector upon expiration of a specified amount of time;

measuring values of the high frequency normalization sector and the BER normalization sector upon expiration of the specified amount of time;

determining a high frequency normalization factor and a BER normalization factor using the initial values of the high frequency normalization sector and the BER normalization sector and the values of the high frequency normalization sector and the BER normalization sector measured upon expiration of the specified amount of time;

measuring values of the high frequency reference sector and the BER reference sector upon expiration of the specified amount of time;

adjusting the values of the high frequency reference sector and the BER reference sector measured upon expiration of the specified amount of time using the high frequency normalization factor and the BER normalization factor; and, determining whether the adjusted values of the high frequency reference sector and the BER reference sector are within predetermined specifications related to the amount of thermal decay.

22. The method of claim 21, wherein normal drive operations are performed if the adjusted values of the high frequency reference sector and the BER reference sector are within the predetermined specifications.

23. The method of claim 21, wherein the head is biased by a biased current and wherein the method further includes the step of:

increasing the bias current if the adjusted value of the high frequency reference sector or the adjusted value of the BER reference sector is outside the predetermined specifications.

24. The method of claim 23, further comprising the step of:

determining whether the increased biased current has reached a bias current limit.

25. The method of claim 24, wherein said information on the disk surface is rewritten if the increased bias current has reached the bias current limit.

26. The method of claim 25, wherein the bias current is returned to an initial value after the information is rewritten on the disk surface.

27. The method of claim 25, wherein a notification is provided in connection with rewriting the information on the disk surface.

28. The method of claim 21, wherein the head is biased by a bias voltage and wherein the method further includes the step of:

increasing the bias voltage if the adjusted value of the high frequency reference sector or the adjusted value of the BER reference sector is outside the predetermined specifications.

29. The method of claim 28, further comprising the step of:

determining whether the increased bias voltage has reached a bias voltage limit.

30. The method of claim 29, wherein said information on the disk surface is rewritten if the increased bias voltage has reached the bias voltage limit.

31. The method of claim 30, wherein the bias voltage is returned to an initial value after the information is rewritten on the disk surface.

32. The method of claim 30, wherein a notification is provided in connection with rewriting the information on the disk surface.

33. The method of claim 21, wherein the high frequency reference sector and the and the BER reference sector are written near an inner diameter of the disk surface.

34. The method of claim 21, wherein the specified amount of time is a random or pseudo-random time.

35. The method of claim 21, wherein the specified amount of time is a fixed period of time.

36. The method of claim 21, wherein the high frequency reference sector is a 1T pattern of magnetic transitions.

37. The method of claim 21, wherein the BER reference sector is a pseudo-random pattern of magnetic transitions.

38. A method comprising the steps of:

providing a disk surface having information stored thereon, said information being written as magnetic transitions which are subject to thermal decay;

providing a head for reading said information, wherein said head is biased by a bias voltage;

determining a value related to the thermal decay of the magnetic transitions; and, increasing the bias voltage to compensate for the thermal decay of the magnetic transitions if the value indicates that the thermal decay has reached an unacceptable level.

39. The method of claim 38, wherein the value related to the thermal decay of the magnetic transitions is determined periodically.

40. The method of claim 38, further comprising the step of:

determining whether the increased bias voltage has reached a bias voltage limit.

41. The method of claim 40, wherein said information on the disk surface is rewritten if the increased bias voltage has reached the bias voltage limit.

42. The method of claim 41, wherein the bias voltage is returned to an initial value after the information is rewritten on the disk surface.

43. The method of claim 41, wherein a notification is provided in connection with rewriting the information on the disk surface.

44. The method of claim 38, wherein the value related to the thermal decay of the magnetic transitions is determined by at least the following steps:

writing a high frequency reference sector on the disk surface;

reading a initial value from the high frequency reference sector at a first time;

storing the initial value from the high frequency reference sector in memory;

reading the high frequency reference sector at a second time to obtain a second value from the high frequency reference sector; and, comparing the second value from the high frequency reference sector to the initial value from the high frequency reference sector to determine the extent of thermal decay of the magnetic transitions.

45. The method of claim 44, further including the step of adjusting the second value from the high frequency reference sector to compensate for head and/or preamplifier variations.

46. The method of claim 38, wherein the value related to the thermal decay of the magnetic transitions is determined by at least the following steps:

writing a BER reference sector on the disk surface;

reading a initial value from the BER reference sector at a first time;

storing the initial value from the BER reference sector in memory;

reading the BER reference sector at a second time to obtain a second value from the BER reference sector; and, comparing the second value from the BER reference sector to the initial value from the BER sector to determine the extent of thermal decay of the magnetic transitions.

47. The method of claim 46, further including the step of adjusting the second value from the BER reference sector to compensate for head and/or preamplifier variations.

* * * * *